United States Patent [19]

Williams, Jr.

[11] Patent Number: 5,533,637
[45] Date of Patent: *Jul. 9, 1996

[54] WEATHERPROOF ELECTRICAL ENCLOSURE

[75] Inventor: Howard M. Williams, Jr., Emmaus, Pa.

[73] Assignee: Hubbell Incorporated, Orange, Conn.

[*] Notice: The term of this patent shall not extend beyond the expiration date of Pat. No. 5,456,377.

[21] Appl. No.: 479,767

[22] Filed: Jun. 7, 1995

Related U.S. Application Data

[63] Continuation of Ser. No. 375,950, Jan. 20, 1995, Pat. No. 5,456,377, which is a continuation of Ser. No. 91,563, Jul. 15, 1993, abandoned, which is a continuation-in-part of Ser. No. 867,470, Apr. 13, 1992, Pat. No. 5,228,584.

[51] Int. Cl.⁶ .................................................. H02G 3/14
[52] U.S. Cl. .................... 220/3.8; 220/3.9; 220/480; 220/242; 220/4.02
[58] Field of Search ...................... 174/67; 439/147; 220/241, 242, 4.02, 3.3, 3.8, 3.9, 476, 480, 478, 3.2

[56] References Cited

U.S. PATENT DOCUMENTS

| | | | |
|---|---|---|---|
| 2,891,102 | 6/1959 | Grimes | 174/67 |
| 3,200,989 | 8/1965 | Hubbell | 220/24.3 |
| 3,252,611 | 5/1966 | Weitzman et al. | 220/24.3 |
| 3,363,216 | 1/1968 | Benedetto | 339/39 |
| 3,686,425 | 8/1972 | Zerwes et al. | 174/53 |
| 3,792,414 | 2/1974 | Smith | 339/36 |
| 4,031,312 | 6/1977 | Coleman et al. | 174/52 R |
| 4,102,466 | 7/1978 | Jadatz | 220/3.8 |
| 4,109,095 | 8/1978 | Kling et al. | 174/67 |
| 4,134,516 | 1/1979 | Sullo | 220/242 |
| 4,265,365 | 5/1981 | Boteler | 220/3.3 |
| 4,280,633 | 7/1981 | Boros | 220/241 |
| 4,342,493 | 8/1982 | Grenell | 339/44 M |
| 4,381,063 | 4/1983 | Leong | 220/242 |
| 4,603,932 | 8/1986 | Heverly | 339/39 |
| 4,740,655 | 4/1988 | Ford | 174/67 |
| 4,810,897 | 3/1989 | Shotey | 307/112 |
| 4,874,906 | 10/1989 | Shotey | 174/67 |
| 4,915,638 | 4/1990 | Domian | 439/142 |
| 4,950,842 | 8/1990 | Menninga | 174/67 |
| 4,967,924 | 11/1990 | Murofushi et al. | 220/3.8 |
| 4,988,832 | 1/1991 | Shotey | 174/67 |
| 5,045,640 | 9/1991 | Riceman | 174/67 |
| 5,218,169 | 6/1993 | Riceman | 174/67 |
| 5,228,584 | 7/1993 | Williams, Jr. | 220/3.8 |
| 5,243,135 | 9/1993 | Shotey | 174/67 |
| 5,456,377 | 10/1995 | Williams, Jr. | 220/3.8 |

FOREIGN PATENT DOCUMENTS

| | | | |
|---|---|---|---|
| 5059593 | 9/1973 | Japan . | |
| 254498 | 7/1926 | United Kingdom | 220/3.8 |
| 326499 | 3/1930 | United Kingdom | 220/3.8 |
| 2151859 | 7/1985 | United Kingdom | 174/67 |

*Primary Examiner*—Stephen J. Castellano
*Attorney, Agent, or Firm*—Jerry M. Presson; David L. Tarnoff

[57] ABSTRACT

An electrical enclosure having a base, a cover, and hinge pivotally connecting the base and cover. The cover has a pair of ears, each provided with a key hole for receiving hinge pins mounted on the base. The pivot pins are provided with keys that align with notch portions of the key holes when the cover is disposed at an obtuse angle, preferably about 180° with respect to the base. After assembly, the base is connected to a support which limits the range of pivotal movement of the cover to an angle less than 180° so that the keys and notch portions can no longer be aligned. The base and cover have top, bottom and two side walls of substantially the same depth and the cover bottom wall has two cord receiving recesses extending inwardly about one-half the depth of the bottom wall to minimize the radius of bending of the cords inside the enclosure and minimize the size of the recesses.

7 Claims, 6 Drawing Sheets

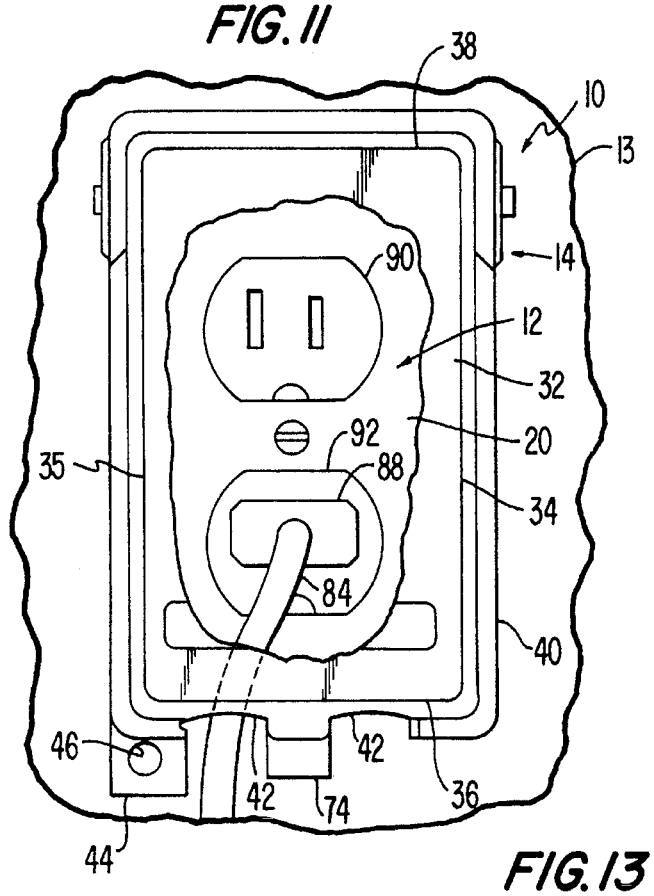
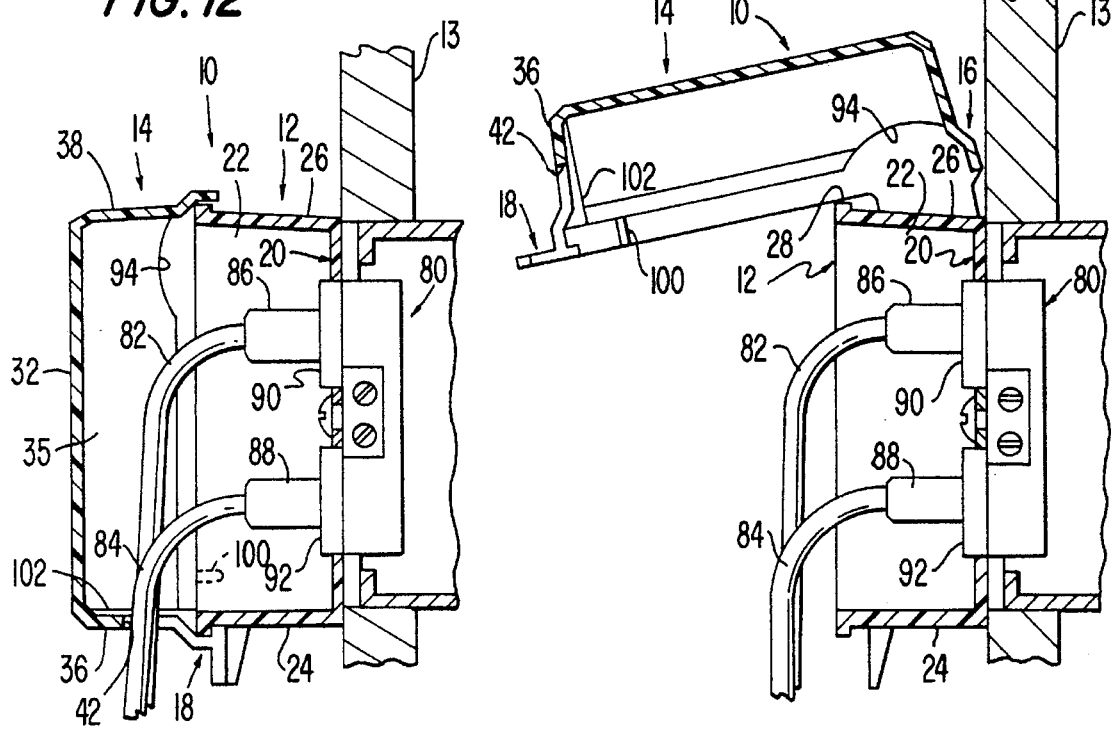

5,533,637

WEATHERPROOF ELECTRICAL ENCLOSURE

RELATED APPLICATIONS

This is a continuation application of Ser. No. 08/375,950 filed on Jan. 20, 1995, now U.S. Pat. No. 5,456,377, which is a continuation of Ser. No. 08/091,563 filed on Jul. 15, 1993, now abandoned, which is a continuation-in-part of Ser. No. 07/867,470 filed on Apr. 13, 1992, now U.S. Pat. No. 5,228,584.

FIELD OF THE INVENTION

The present invention relates generally to housings and enclosures for electrical fixtures such as electrical outlets and switches. More particularly, the invention is directed to a weatherproof electrical enclosure having a tamper resistant hinge assembly, minimum electrical cord bending radii, and minimum cord slot size.

BACKGROUND OF THE INVENTION

Weatherproof electrical boxes are well known in the industry to provide a cover for the electrical receptacle in an outlet box so that the box can be mounted outdoors. The purpose of the cover is primarily to prevent dust, water, and other foreign materials from entering the receptacle. It is of particular importance to prevent rain water from entering the electrical receptacle to reduce the risk of short circuits, fire and damage to the receptacle and the electrical system connected to the receptacle. The previous weatherproof covers have provided some protection against water and dust when in a closed position. These enclosures, however, often provide inadequate protection when appliance cords are plugged into the receptacle. It is often necessary to remove the appliance cords to insure complete safety during rain storms.

In many electrical wiring applications, the electrical outlet boxes are readily accessible by a number of unauthorized personnel. It is often necessary to provide a suitable locking mechanism on the cover to restrict access to the receptacle only to authorized personnel. Unauthorized access and tampering with electrical wiring devices can result in serious injury to workers who are servicing a piece of electrical equipment. Recent regulations require locking mechanisms for electrical outlet boxes in order to prevent injuries resulting from tampering or accidental connection of electrical equipment. It is also desirable to have an electrical outlet box having one or more cables connected to the box and which can be locked to prevent unauthorized disconnection without damaging the cable.

Many of the weatherproof electrical enclosures which have been previously employed in the industry can be easily vandalized to attain unauthorized access. The enclosures often include a hinged cover that is connected to a base by a hinge pin. The cover usually can be separated from the base by forcing the cover with a pry bar or other tool. Often the cover is forced from the hinge assembly. The unauthorized tampering damages the enclosure and results in increased operating costs. Efforts to increase the tamper resistance of the electrical enclosures usually include strengthening the enclosure and using complex hinges to attach the cover to the base. These measures typically increase manufacturing costs and require more complex assembly operations. One example of a locking weatherproof cover for an outlet box is disclosed in U.S. Pat. No. 3,200,989 to Hubbell.

Examples of various weatherproof covers and electrical boxes are disclosed in U.S. Pat. No. 4,102,466 to Jadatz; U.S. Pat. No. 4,134,516 to Sullo; U.S. Pat. No. 4,265,365 to Boteler; and U.S. Pat. No. 4,967,924 to Murofushi.

SUMMARY OF THE INVENTION

The present invention obviates the disadvantages and limitations of the previous weatherproof covers and outlet boxes while providing security against unauthorized access and tampering of the electrical receptacle. Accordingly, a primary object of the invention is to provide a tamper resistant electrical enclosure which is sufficiently weatherproof for outdoor use and which minimizes electrical cord bending.

Another object of the invention is to provide an electrical enclosure and particularly an outlet box that is simple and inexpensive to manufacture, assemble and use and that has a relatively few number of parts.

Another object of the invention is to provide an electrical enclosure having a tamper resistant hinge which can be easily assembled and manufactured, and where the cover portion of the outlet box cannot be easily separated from the base when the outlet box is in use.

The foregoing objects are basically attained by providing an electrical enclosure, the combination comprising: a cover having top, bottom and two side walls, and a front wall defining a first cavity therein; a base having top, bottom and two side walls, and a rear wall defining a second cavity therein; and means, coupled to said cover and base, for pivotally coupling said cover and base, said cover bottom wall having at least one recess therein adapted to receive an electrical cord therein, said recess having an axial length equal to about one-half the depth of said cover bottom wall.

Other objects and advantages of the invention will become apparent from the following detailed description, which when taken in conjunction with the drawings, discloses preferred embodiments of the invention.

BRIEF DESCRIPTION OF THE DRAWINGS

Referring to the drawings which form a part of this disclosure:

FIG. 11 is a front elevational view of the electrical enclosure in accordance with the invention coupled to an outlet and supporting an electrical cord and plug;

FIG. 12 is a right side elevational view in substantially longitudinal section of the enclosure shown in FIG. 11 but with two cords supported therein, the enclosure being in the closed position; and FIG. 13 is a right side elevational view of the enclosure the same as FIG. 12 except with the cover being in the open position.

DETAILED DESCRIPTION OF THE INVENTION

Figure 1:
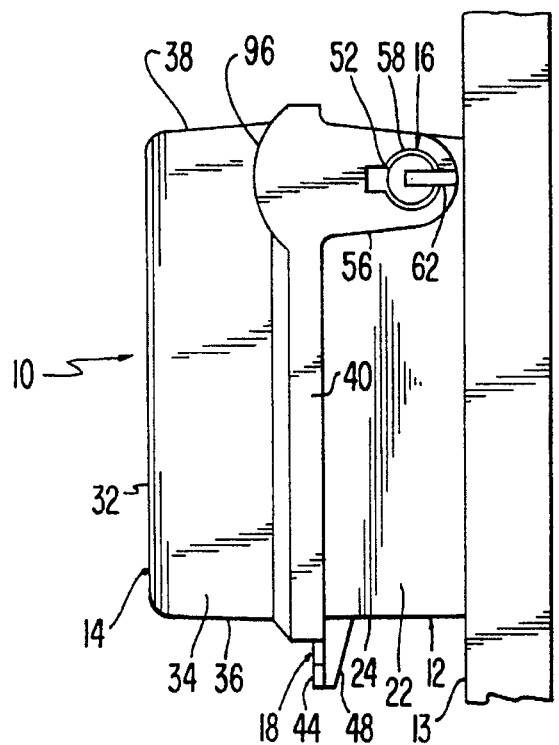
FIG. 1 is a side elevational view of the electrical enclosure mounted on a vertical support surface in the closed position in accordance with the present invention.

As seen in FIGS. 1–10, the weatherproof enclosure 10 in accordance with the invention comprises a base 12 mountable on a support structure 13, such as a wall port or other suitable structure generally presenting a planar surface, using any suitable and well known means such as threaded fasteners (not shown). Preferably, the base 12 is mounted in a vertical orientation since, commonly, an electrical component such as an outlet (not shown) which would be covered by the enclosure 10, is oriented vertically with respect to the support structure 13. A cover 14 is pivotally connected to the base 12 by a hinge 16 disposed at one end of the cover and base and secured in the closed position by a latch 18 disposed at the opposite end.

Figure 2:
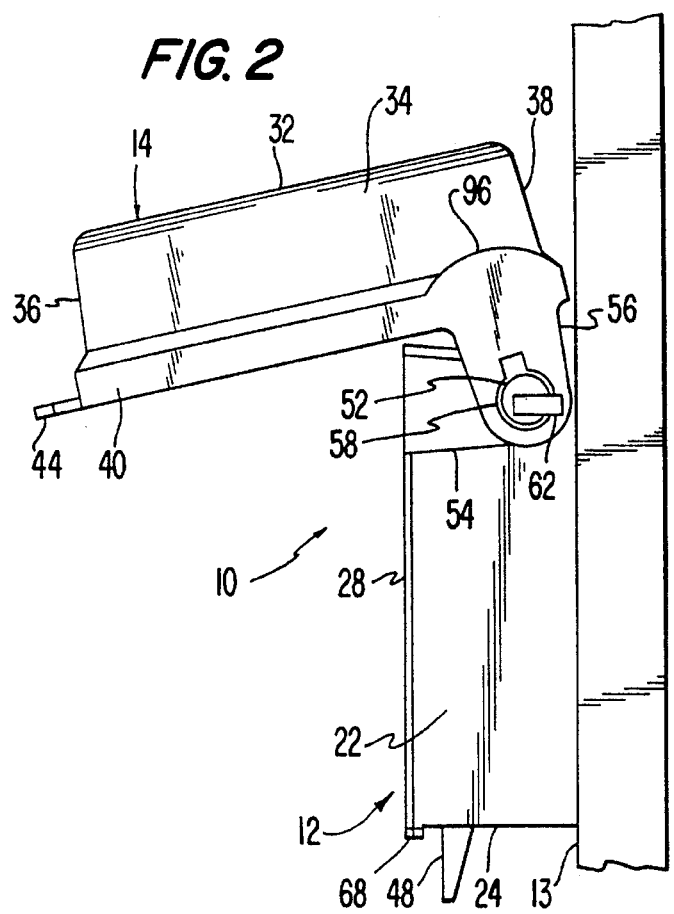
FIG. 2 is a side elevational view of the electrical enclosure of FIG. 1 with the cover pivoted to the full open position in which the upper limit of the range of pivotal movement is determined by abutment of the rear edge of the cover against the planar surface of the support surface.
Figure 9:
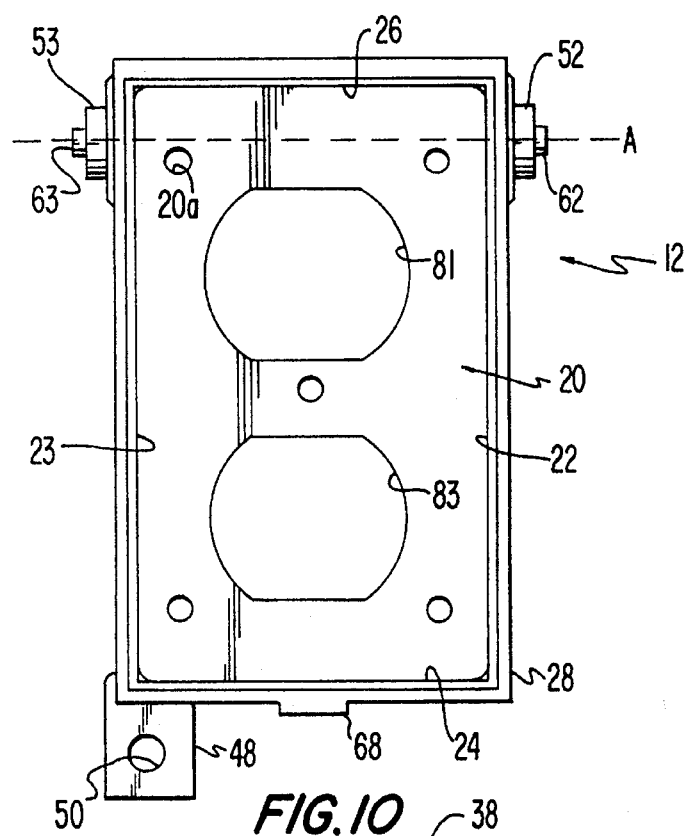
FIG. 9 is a front elevational view of the base removed from the cover.

As shown in FIG. 9, the base 12 has a generally box-like configuration and includes a rear wall 20 having holes 20a formed therein for mounting the base 12, the support structure 13, a first pair of opposite side walls 22 and 23 extending upwardly from the rear wall 20, and a second pair of opposite side walls 24 and 26 which, when the enclosure 10 is mounted in its normal, vertical orientation shown in FIGS. 1 and 2, constitute lower or bottom and upper or top end walls of the base 12, respectively. The base 12 is preferably formed as a unitary structure, and may be made from metal or a plastic material. Although the preferred embodiment illustrated herein has a rectangular configuration, other shapes may be employed. For example, if the configuration was circular, oval or otherwise curved, the single continuously curvilinear side wall forming an endless loop could form the base. In any configuration, the upper edge of the side wall or side walls define an opening and cavity which are closed by the cover 14.

An outer lip 28 may extend along the periphery of the rectangular opening of the base 12 for promoting a weatherproof seal with the cover 14. The base 12 is preferably formed for mounting on a support surface, and in particular a vertical planar support structure 13 as the wall or post. As best shown in FIG. 9, the plurality of holes 20a are provided for securing the base 12 to the support structure 13 by means of screws, nails or other fasteners. The rear wall or surface 20 may also be provided with apertures, cut-out areas, score lines for punching out areas to permit access to lines, fixtures, outlets, etc. For example, outlet apertures 81 and 83 are seen in FIG. 9.

Figure 10:
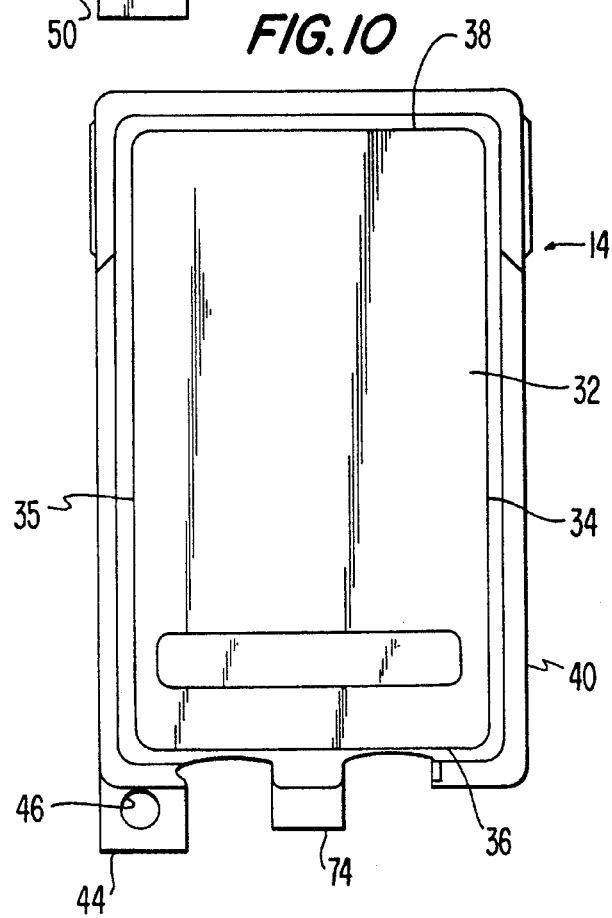
FIG. 10 is a front elevational view of the cover.

The cover 14 is dimensioned to be hinged to the base 12 and pivot from a full open position to a closed position, with infinite intermediate positions therebetween. The cover is further dimensioned to complement the base to form a weatherproof seal along the open end of the base 12. In a preferred form of the invention, the cover 14 is molded or otherwise formed from an electrically insulating material, such as a substantially rigid plastic. As shown in FIG. 10, the cover 14 includes a front wall 32, a first pair of opposite side walls 34 and 35, and two opposite lower or bottom and upper or top end walls 36 and 38 which define an outer opening and a cavity therein. The cover 14 is molded to form an internally stepped lip-engaging portion 40 which extends continuously along the periphery of the open end of the cover 14. The lip-engaging portion 40 is dimensioned to receive the lip 28 of the base 12 which facilitates a weatherproof seal when the cover 14 is in the closed position with respect to the base 12. The cover 14 may have other shapes to close on a similarly shaped base. Moreover, the cover need not have a rear surface 20 if other means can be employed, such as tabs with mounting holes, etc.

Figure 7:
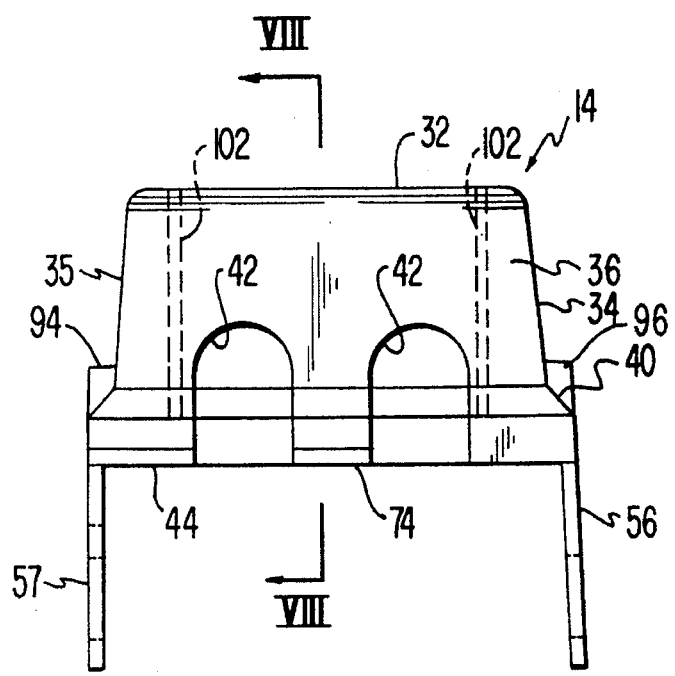
FIG. 7 is a bottom end view of the cover of the electrical enclosure removed from the base as seen from the bottom end of FIG. 1.

The cover 14 is pivotally connected to the base 12 to form a clam-shell structure by the hinge 16 so that the cover 14 is able to pivot to an open position to allow access to the electrical components contained within the base 12. In a preferred embodiment of the invention, the electrical component within the base is an electrical outlet receptacle. To accommodate connection of the receptacle with an electrical cable (not shown), the cover 14 includes a pair of spaced-apart U-shaped cord entrance openings or recesses 42 formed in the end wall 36 as shown in FIG. 7. The U-shaped openings or slots 42 extend from the edge of the end wall 36, through the lip-engaging portion towards the front wall 32. The depth of the U-shaped cord entrance openings 42 is dimensioned to allow the cover 14 to be closed onto the base 12 without excessive bending or stressing of the cables.

The enclosure 10 is primarily intended to be mounted on a vertical support as shown in FIG. 1 with the hinge 16 oriented with a horizontal pivot axis A at the upper end of the enclosure. The cover 14 will thus open by pivoting upwardly about the axis A. In the closed position, the cover 14 will form a weatherproof seal along the top and side edges as seen in FIG. 1 and the cord entrance openings 42 will be positioned at the bottom to prevent rain water from entering the enclosure.

The cover 14 also includes a flange 44 on the end wall 36 extending outwardly from the lip engaging portion 40. An aperture 46 is provided in the flange 44 as shown in FIG. 10. The base 12 also includes a flange 48 extending outwardly from the end wall 24. The flange 48 includes an aperture 50 and is positioned to overlie the flange 44 when the cover is in the closed position such that the apertures 46 and 50 are aligned. A suitable lock mechanism (not shown) may be placed through the apertures to lock the cover 14 in the closed position. In a preferred form of the invention, the lock mechanism is a conventional padlock having a U-shaped shackle passing through the apertures in the juxtaposed flanges. Other anti-tampering means may also be used, such as, for example, a lead sealed security wire.

Figure 3:
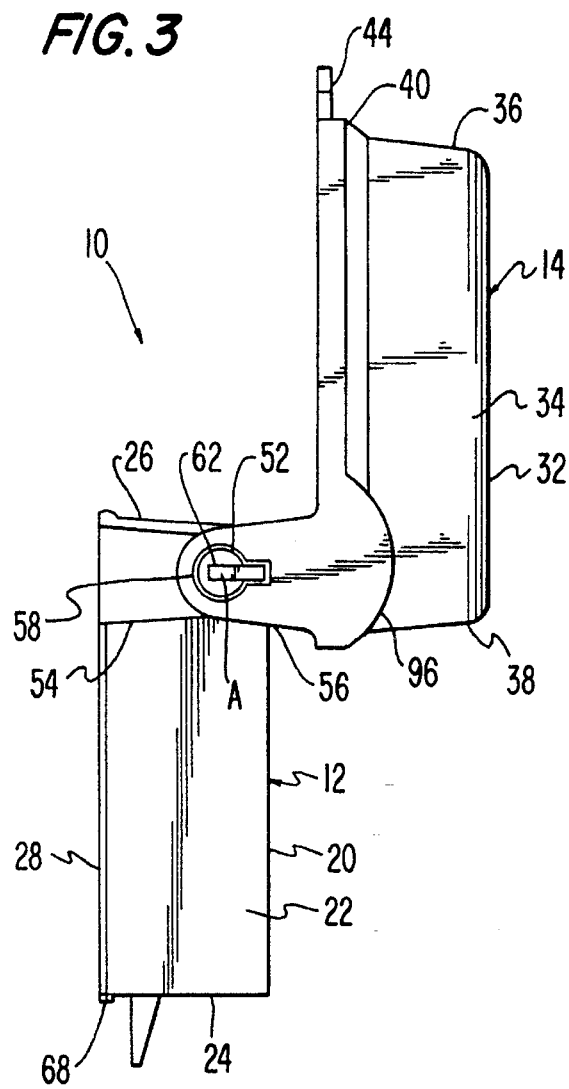
FIG. 3 is a side elevational view of the electrical enclosure of FIG. 1 in an unlocking open position where the key on the hinge pin is aligned with the notch in the cover, preferably when the cover is rotated 180° with respect to the base.
Figure 4:
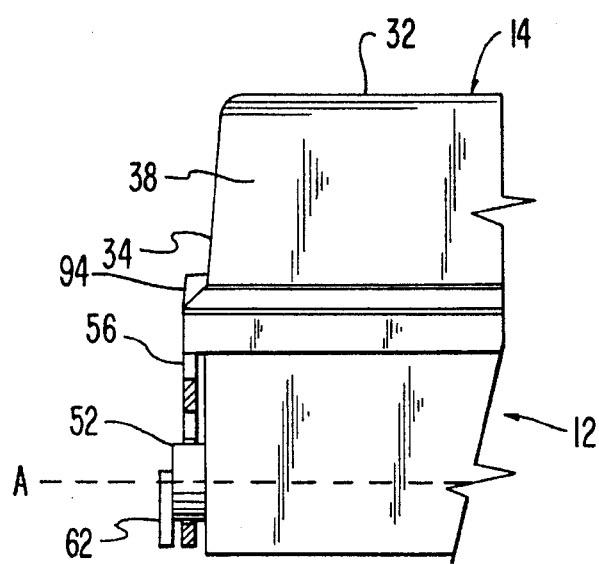
FIG. 4 is an end view of the enclosure as seen from the top side of FIG. 1 showing a partial cross-sectional view of the hinge in accordance with the invention.
Figure 5:
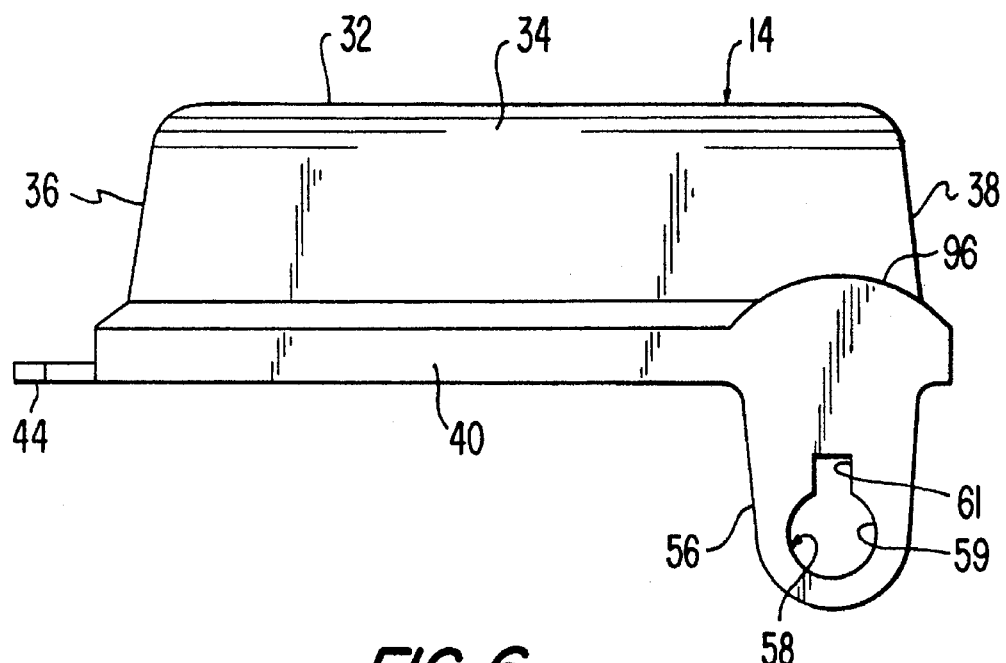
FIG. 5 is a side elevational view of the cover of the electrical enclosure of FIG. 1 removed from the base.
Figure 6:
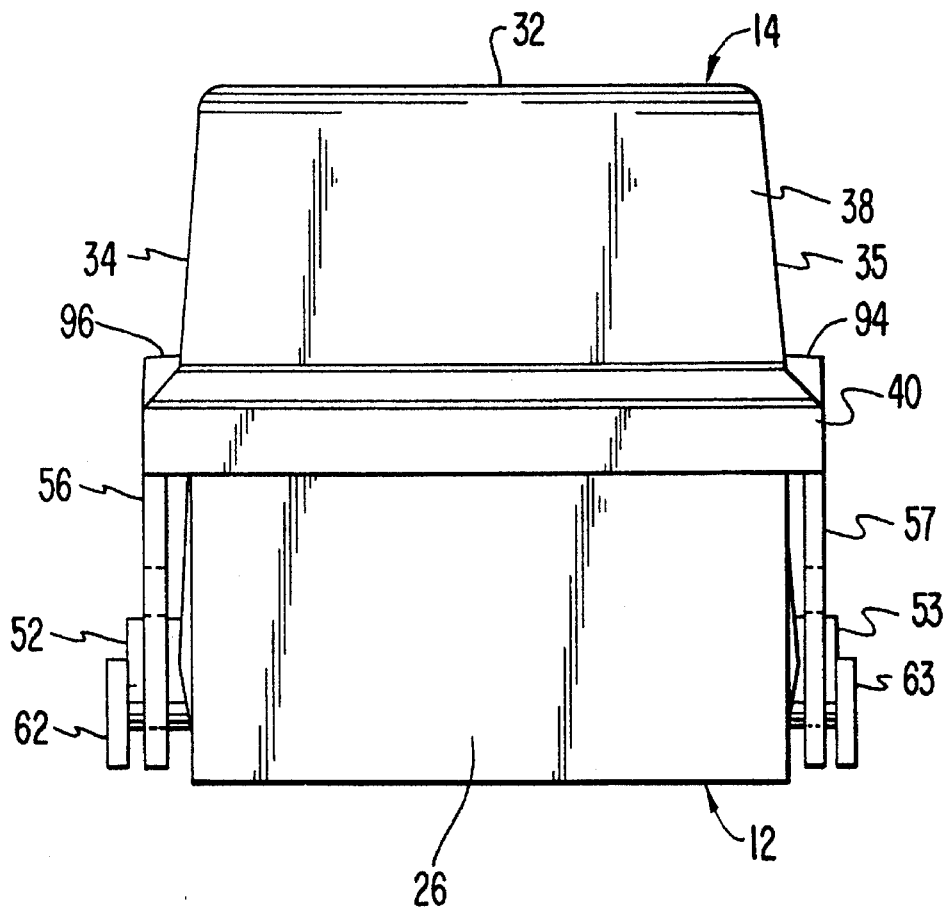
FIG. 6 is an end view of the electrical enclosure of FIG. 1, and showing the electrical enclosure in the closed position.

The hinge 16 in accordance with the invention includes two hinge pins 52 and 53 extending outwardly from each of the side walls 22 and 23, respectively, of the base 12. The hinge pins 52 and 53 are coaxially positioned on the side walls to define the pivot axis A of the cover 14. As shown in FIGS. 1–3, the hinge pins 52 and 53 are positioned proximate to the upper side wall 26 of the base 12 and proximate to the rear wall 20. A thickened area 54 on the side walls 22 and 23 strengthen the base in the area of the hinge pins 52 and 53. The hinge pins 52 and 53 may be integrally formed with the base 12 as cylindrical projections, or other suitable fixed pin or shaft means maybe employed. For example, a shaft could extend through holes provided in opposite sides of the base 12 to support the cover 14 on opposite end portions thereof.

Preferably, the cover 14 is pivotally connected to the base 12 as shown in FIG. 2. The cover 14 is provided with a pair of ears 56 and 57 extending outwardly from opposite side walls 34 and 35. Ear 56 includes a key hole 58 having a circular portion 59 and a rectangular notch portion 61. Ear 57 has a similar key hole aligned with key hole 58 such that the circular portions of the key holes receive and thereby journal the hinge pins 52 and 53. The ears 56 and 57 are positioned proximate to the side wall 38 to allow the cover 14 to pivot easily from an open position to a closed position, and to allow the cover 14 to seal snugly against and thereby engage the outer lip 28 on the perimeter of the base 12. The arrangement of the hinge pins 52 and 53, and the key holes in the ears 56 and 57 enable the cover 14 to pivot a full 180° with respect to the base 12 as shown in FIG. 3 when the base 12 is not mounted on a corresponding support structure. When the base 12 is mounted on the support structure 13 as illustrated in FIG. 2, the side wall 38 of the cover 14 abuts the support structure 13 when the cover is opened. As can be seen in FIG. 2, the support 13 limits the pivoting movement of the cover and prevents the cover 14 from pivoting to the position shown in FIG. 3. The cover 14 can be opened sufficiently to allow access to the electrical components contained in the base 12.

Each hinge pin 52 and 53 has a key 62 and 63, respectively, which extends radially outwardly from an end face of each pin. The keys may be integrally formed with the pins or fixedly connected thereto. Moreover, the keys may also be attached or formed on the cylindrical surface of the pins. In a preferred form of the invention, when the cover 14 and base 12 are assembled, the keys 62 and 63 and the notch portions 61 extend in diametrically opposite directions when the cover 14 is in the closed position on the base 12. As shown in FIG. 1, the key 62 extends radially outwardly from the hinge pin 52 toward the rear wall 20 of the base 12. The notch portion 61 of the key hole also is positioned to extend towards the surface 32 of the cover 14. This arrangement is generally preferred since the notch in the aperture inherently produces a weakened area, and it is desirable to position the weakened area in the ears adjacent the cover. The keys 62 and 63 preferably extend radially outward from the hinge pins 52 and 53 a distance sufficient to prevent the cover 12 from being removed from the hinge pins except when the keys 62 and 63 are aligned with the notch portions 61 of the key holes.

Figure 8:
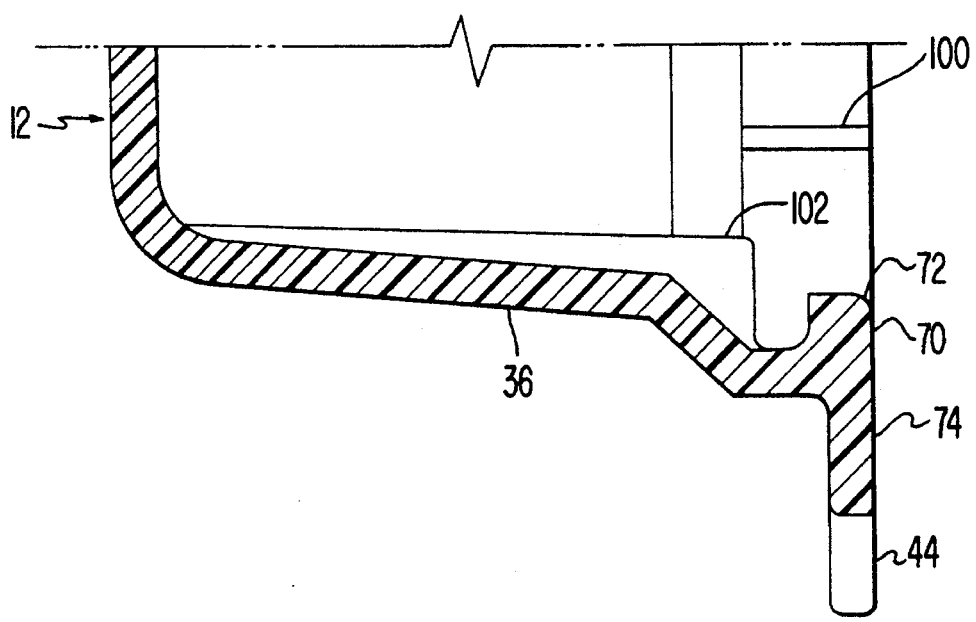
FIG. 8 is an enlarged cross-sectional view of the cover as taken along line VIII—VIII of FIG. 7, and showing the details of the cover latch.

The latch 18 is provided on the enclosure 10 to secure the cover 14 in the closed position. The latch comprises a tab 68 extending outwardly from the end wall 24 of the base 12. As shown in FIG. 2, the tab 68 is positioned adjacent the opening of the base and near the lip 28. The latch 18 further comprises a hook portion on the cover 14 to engage the tab 68 on the base 12. As shown in FIG. 8, the hook portion comprises an inwardly extending leg 70 on the peripheral edge of the end wall 36 of the cover 14. The leg 70 extends from the end wall 36 a distance sufficient to engage the tab 68. As the cover 14 is moved to the closed position, the leg 70 engages the tab 68. Force applied to the cover 14 causes the leg 70 to snap fit over the tab 68 to latch the cover in the closed position. The leg 70 includes a beveled portion 72 to facilitate the latching operation. A tab 74 extends outwardly from the lip engaging portion 40 of the cover 14 proximate to the leg 70 to serve as a handle during opening and closing operations of the cover. The cover 14 is preferably made from a plastic material to provide some resilience to the leg 70. The latch 18 is released by pulling firmly on the tab 74 in the direction of the pivoting movement of the cover 14. The resilience of the plastic material allows the leg 70 to be released from the tab 68. Other suitable latching mechanisms may be employed, as well as other types of pull tabs.

Assembly and Operation

The enclosure 10 must be assembled prior to attaching the enclosure to a corresponding support wall, post, etc., since by design, the support wall limits the range of pivotal movement of the cover 14 in such a way that the keys 62 and 63 prevent separation of the ears 56 and 57 from their corresponding pins 52 and 53, respectively. To assemble the enclosure 10, the cover 14 and base 12 are positioned as shown in FIG. 3 to extend in opposite directions. The pins 52 and 53 can be fitted into the keyhole 58 with the cylindrical pins 52 and 53 journalled in the circular portions 59 of the key holes. At the same time, the keys 62 and 63 pass through the notch portions 61 so as to permit the ears 56 and 57 to slide onto the pins. This forms a hinge whereby the cover 14 is free to pivot about the pivot axis A. As shown in FIG. 3, once the cover 14 is rotated a few degrees, the keys lock the cover 14 onto the pins 52 and 53 while permitting free rotation thereon. The keys prevent the ears from being spread outwardly to separate the pins from their respective mounting holes.

Once the cover 14 is rotated sufficiently to clear the plane of the rear surface 20 of the base 12, the enclosure 10 can be attached to a suitable support wall 13 to enclose an electrical component, thereby protecting same from the elements and/or to prevent unauthorized access by means of a locking device, such as a padlock having a shackle passing through the holes 46 and 50 of the flanges 44 and 48. Attachment to the support 13 can be achieved by any conventional means, such as screws, nails etc. passing through the holes 20a in the rear wall 20. If a rear wall 20 is not necessary, attachment holes can be provided where appropriate in flanges extending outwardly from the side walls 22, 23, and the end walls 24 and 26. As shown in FIG. 2, the positioning of the hinge pins 52 and 53 and the key holes 58, the support 13 limits the range of pivotal motion of the cover 14 to around 90°. In this embodiment, the support structure 13 abuts the end wall 38 in the area of the lip engaging portion 40 to prevent the cover 14 from being opened to the unlocking position, preferably at about 180° to align the keys with the notch portions of the key holes. As previously noted, since the enclosure may be locked in the closed position by passing the shackle of a padlock through the apertures 46 and 50 of the locking flanges 44 and 48, the enclosure 10 cannot be removed from its support structure 13 since access to the mounting screws will also be blocked.

Since the keys 62 and 63 and the notch portion 61 are misaligned when the cover 14 is in the closed position, the cover cannot be separated from the base. The keys on the hinge pins prevent the cover 14 from being removed from the base by spreading the ears 56 and 57 apart from the base. This arrangement provides a tamper-proof enclosure to prevent unauthorized access to the electrical components within the base.

Embodiment of FIGS. 11–13

As seen in FIGS. 11–13, the electrical enclosure 10 in accordance with the invention is shown used in conjunction with electrical outlet 80 and electrical cords 82 and 84 having plugs 86 and 88 at their ends for electrical connection to receptacles 90 and 92 in the outlet 80.

As shown in FIGS. 11–13, advantageously the walls in the cover and base overlap when closed, and have substantially the same depth, preferably about 1 9/16 inches. In addition, recesses 42 in the cover have axial lengths that are about one-half the depth of the cover bottom wall 36, preferably about 14/16 inch. By so constructing enclosure 10, cords 82 and 84 have relatively large radii of bending when installed in outlet 80 and located in recesses 42 to resist potentially harmful crimping or extreme bending, which would lead to electrical, conduction problems. In addition, due to this construction, the recess length is minimized, resulting in less chance of foreign material entering the enclosure through the recesses.

Assisting this construction is the coupling of the ears 56 and 57 on the cover side walls and the hinge pins 52 and 53 on the base side walls, as well as the use of the curved recesses 94 and 96 on the cover which receive the base top wall 26 therein during relative pivoting of the cover and base as seen by comparing FIGS. 12 and 13.

Advantageously, lip 28 is positioned only on base top wall 26, as seen in FIGS. 12 and 13, to assist in limiting ingress of foreign material into the inside of the enclosure 10, while allowing enough open space between the overlapping parts of the cover and base. This allows the enclosure to "breathe", and thus encourage evaporation of moisture located inside the enclosure and movement of the moisture outside the enclosure, thereby discouraging potential damage to metallic parts of the electrical devices inside the enclosure. This is assisted by the use of two extensions 100 coupled to side walls 35 and 36 of the cover and interposed between those side walls and the side walls 22 and 23 of the base, as seen in FIGS. 8, 12 and 13, and engaging side walls 22 and 23 when the cover is closed over the base. These extensions maintain the spacing between the overlapping walls of the cover and base and prevent a sideways relative movement therebetween.

As seen in FIGS. 8, 12 and 13, a pair of stops 102 are rigidly coupled to the cover bottom wall 36 adjacent and on opposite sides of latch 18 which abut base bottom wall 24 when the cover and base are in their closed position.

While advantageous embodiments have been chosen to illustrate the invention, it will be understood by those skilled in the art that various changes and modifications can be made therein without departing from the scope of the invention as defined in the appended claims.

What is claimed is:

1. An electrical enclosure for covering a portion of an electrical cord and its plug which is received in an electrical receptacle, the combination comprising:

a cover having top, bottom and two side walls, and a front wall defining a first cavity therein, said cover bottom wall having at least one cord recess therein adapted to receive an electrical cord therein;

a base having top, bottom and two side walls, and a rear wall defining a second cavity therein, said rear wall having an outlet aperture and a mounting hole therein for securing said rear wall of said base to the receptacle; and pivot means, coupled to said cover and base, for pivotally coupling said cover and base, said walls on said cover and base having substantially the same depth with said at least one cord recess being spaced from said rear wall of said base so that the electrical cord of the plug does not bend towards said rear wall by said base.

2. An electrical enclosure according to claim 1, wherein the depth of said walls is about 1 9/16 inches.

3. An electrical enclosure according to claim 1, and further comprising an extension interposed between overlapping parts of said cover and base to maintain spacing therebetween.

4. An electrical enclosure according to claim 3, wherein said extension is coupled to said cover.

5. An electrical enclosure according to claim 1, and further comprising at least one stop coupled to said cover for engaging said base bottom wall.

6. An electrical enclosure according to claim 1, and further comprising a lip coupled to said base top wall and extending towards but ending short of said cover top wall.

7. An electrical enclosure according to claim 1, wherein said means for pivotally coupling comprises a pair of ears coupled to said cover side walls and a pair of hinge pins coupled to said base side walls.

* * * * *